United States Patent [19]
Jackson, Jr. et al.

[11] 3,791,207

[45] Feb. 12, 1974

[54] WIND TUNNEL MODEL AND METHOD

[75] Inventors: Charlie M. Jackson, Jr., Yorktown; Dallas G. Summerfield, Hampton, both of Va.

[73] Assignee: The United States of America as represented by the National Aeronautics and Space Administration, Washington, D.C.

[22] Filed: June 19, 1972

[21] Appl. No.: 263,815

[52] U.S. Cl. .................................................. 73/147
[51] Int. Cl. ............................................. G01m 9/00
[58] Field of Search ........................................ 73/147

[56] References Cited

UNITED STATES PATENTS

| | | | |
|---|---|---|---|
| 2,523,481 | 9/1950 | Rabenhorst | 73/147 |
| 2,551,526 | 5/1951 | Campbell | 73/147 |
| 2,602,329 | 7/1952 | Clark | 73/147 |

*Primary Examiner*—S. Clement Swisher
*Attorney, Agent, or Firm*—Howard J. Osborn; Wallace J. Nelson; John R. Manning

[57] ABSTRACT

A wind tunnel model having pressure measurement orifices formed integrally therein and a process for making same.

8 Claims, 4 Drawing Figures

PATENTED FEB 12 1974 3,791,207
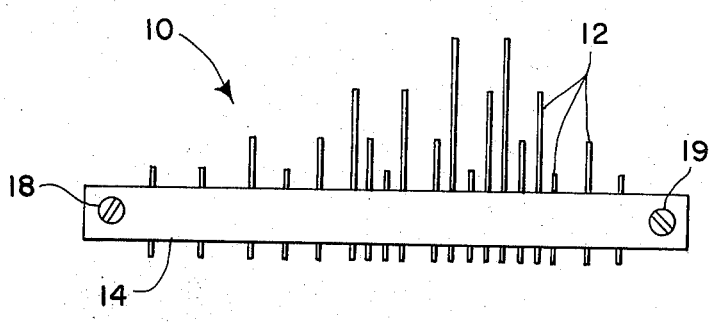 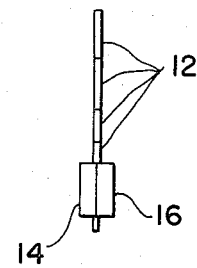
FIG. 1  FIG. 2
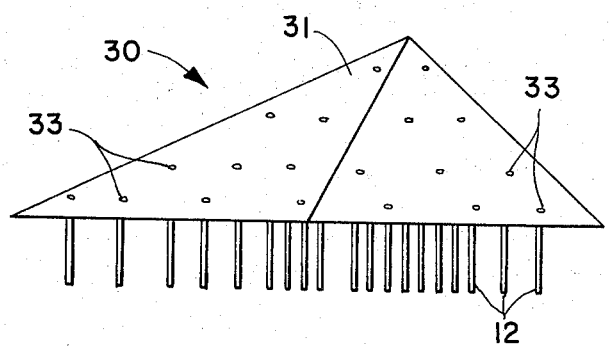 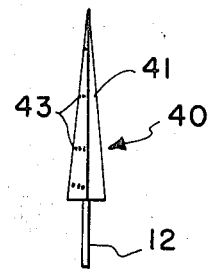
FIG. 3  FIG. 4

WIND TUNNEL MODEL AND METHOD

ORIGIN OF THE INVENTION

This invention was made by employees of the National Aeronautics and Space Administration and may be manufactured or used by or for the Government of the United States without the payment of any royalties thereon or therefor.

BACKGROUND OF THE INVENTION

The aerodynamic characteristics of wings and other airfoil surfaces are normally evaluated by wind tunnel tests on small scale models. Much of the experimental aerodynamic research data is obtained by measuring the surface pressures on models of specific configurations in the wind tunnel. The construction of the models and installation of the necessary pressure orifices has heretofore been a difficult and expensive task. For example, prior art methods for construction of pressure-test models of airfoils have included casting or machining the desired test shape for the airfoil with the pressure orifices then installed by one of two techniques depending on the airfoil thickness and the nature of the data to be obtained. If the test airfoil is sufficiently thick, slots are machined in the airfoil surface and steel tubing embedded in the slots with clear plastics. The orifices are then drilled through the plastic and into the tubing. For thin airfoils, the tubing is installed through the airfoil from the opposite side of the pressure orifices desired and attached to the wing in an exposed position on that side.

When the technique of embedding the tubes in the surface is used, it is difficult to maintain the airfoil shape. The process of installing the tubing through the airfoils is also undesirable because the aerodynamic shape of the surface opposite to the instrumental side is destroyed by the presence of the tubing and if the airfoil is not symmetrical the model must be reinstrumented or remade to provide the surface pressures on the opposite side.

It is therefore an object of the present invention to provide new and novel wind tunnel models.

Another object of the present invention is a novel method of making aerodynamic wind tunnel models having integrally formed pressure instrumentation capabilities.

A further object of the present invention is a simplified method of making aerodynamic wind tunnel models having pressure orifices therein.

An additional object of the present invention is a novel method of providing orifices to a wind tunnel test model.

The foregoing and other objects are attainable in the present invention by clamping a plurality of diverse length, small diameter tubular members in fixed spaced relationship, casting an aerodynamic model configuration about one end of the assembled tubular members, and drilling a plurality of transverse holes through the case model so that one hole intersects with each individual tubular member. One end of the clamped tubular members are of even length extending from one side of the clamping element and of uneven length extending from the other side of the clamping member with the ends of the uneven lengths being crimped or otherwise closed. The cast material completely covers the uneven length ends of the tubular members while leaving the clamping fixture and the even length portions of the tubular members exposed for subsequent connection with suitable conventional pressure measurement instrumentation.

A more complete appreciation of the invention and many of the attendant advantages thereof will be readily apparent as the same becomes better understood by reference to the following detailed description when considered in connection with the accompanying drawings wherein:

FIG. 1 is a view of an assembled array of tubular members clamped together prior to casting of the aerodynamic configuration therearound;

FIG. 2 is a side view of the clamped tubular array shown in FIG. 1;

FIG. 3 is a view of an aerodynamic airfoil wind tunnel model constructed in according with the present invention; and FIG. 4 is a side view of a modified airfoil wind tunnel model according to the present invention.

Referring now to the drawings, FIGS. 1 and 2 show a tubular array as employed in the present invention and generally designated by reference numeral 10. Tubular array 10 includes a plurality of small diameter tubular members 12 clamped in spaced parallel adjacency by a pair of clamp blocks 14 and 16. A pair of countersunk screws 18 and 20 serve to secure blocks 14 and 16 together. Suitable channels are machined or otherwise formed in the opposed faces of clamp blocks 14 and 16 so as to receive tubular member 12 therebetween in tight fixed relationship. As shown in the drawings, tubular members 12 are of diverse lengths with an equal length of each tube extending from one side of blocks 14 and 16 and with the uneven lengths thereof extending from the other side of blocks 14 and 16. The even length tubes are those disposed at the base of the constructed airfoil while the uneven lengths are designed to extend to varying distances within the airfoil toward the leading edge thereof.

Referring now to FIGS. 3 and 4, two finished airfoil body configurations are shown as constructed in accordance with the present invention and as generally designated, respectively, by reference numerals 30 and 40. These airfoil models utilize the tubular array of FIGS. 1 and 2 and are formed by casting a metal or other solidifiable material 31 and 41 around the tubular array 10 so as to completely encase the uneven length portions of tubular members 12. The even length portions of tubular members 12 and clamp blocks 14 and 16 are left exposed. After solidification of the casting material 31, the clamp blocks 14 and 16 are removed and sufficient lengths of the tubular members 12 are left exposed for connection with suitable and conventional pressure measurement instrumentation. After casting the material 31, for example, about an array of tubular members 12, the airfoil is finished and polished in a conventional manner to achieve the precise desired exterior configuration.

An X-ray photo is then taken of the airfoil body 30 to precisely locate the individual tubes 12 therein. Tubes 12 are crimped or otherwise closed at the embedded ends thereof prior to the casting operation to prevent any solid casting material from entry therein. The x-ray film is then used as a template to permit drilling of transverse holes 33, one for each tubular member 12, to intersect perpendicularly with the individual tubular members 12. Holes 33 are positioned at the points on airfoil model 30 where pressure measurements are desired during a wind tunnel test and tubular members 12 are connected to conventional pressure measurement instrumentation during testing.

FIG. 4 is similar to FIG. 3 but of a different configuration and showing pressure openings drilled in only one surface of body 41 of airfoil 40. It is to be understood that such openings may be made in any surface of the airfoil so as to intersect with the tubular members 12.

Although no specific material has been mentioned for the airfoil bodies, it is to be understood that any material normally used for model airfoils is considered within the scope of the present invention. In a specific example 355 aluminum alloy was used for the cast airfoil body and stainless steel S.A.E. 30347 -0.065 inch O.D. was used for the tubing to cast an airfoil of 16 inch chord and 4 inch semi-span. In this example, seventy pressure orifices 33 of 0.040 inch diameter were drilled through the airfoil body portion 31 to intersect with a like number of tubular members 12.

As mentioned hereinbefore, the tubing core is constructed by clamping the desired number of tubes 12 in the proper configuration with a split block of aluminum or the like. The uneven lengths of the tubing are then crimped or otherwise sealed to prevent molten cast material from entry therein. The tubing block, formed of clamp blocks 14 and 16 is closed in tight engagement with the tubing via countersunk screws 18 and 20 and serves in conjunction with the pattern 40 to form the part of the mold commonly referred to as the core print. An aluminum model is then cast in the normal way with the tubing core in position in the casting mold. The aluminum alloy referred to hereinbefore is heated to a pour temperature of 1,350° F. Where steel tubing is used for members 12 the normal casting shrinkage and differences in the thermal expansion between aluminum and steel insure a sufficiently tight bond between the tubing and model such that no leaks occur. The casting is then finished to the desired shape in a conventional manner and the x-rays taken to provide templates for drilling the pressure orifices as described hereinbefore.

Alternate embodiments of the model casting process described herein would include different tubing core configurations, shapes other than for airfoil bodies and alternate methods of securing the tubing core in the mold other than the clamp blocks shown. For example, the tubing array 10 could be formed by welding each of the tubular members to an adjacent member. Also, various improvements over conventional coating techniques, such as preheating the tubing core 10 to essentially the temperature of the molten casting metal to minimize thermal warpage is also considered within the scope of the present invention.

Thus, it is readily seen that the present invention provides a novel process of making wind tunnel airfoil models for pressure measurements thereof that results in an improved model that exhibits more reliability than previous models and a process that reduces the cost of providing instrumented pressure models to essentially one-half of the cost of prior art methods.

There are obviously many modifications and variations of the present invention possible in the light of the above teachings. It is therefore to be understood that within the scope of the appended claims the invention may be practiced otherwise than as specifically described.

What is claimed as new and desired to be secured by Letters Patent of the United States is:

1. A method of making a perforated metal structure having precise locations of the perforations therein comprising the steps of:
   a. assembling a plurality of tubular members in fixed, spaced relationship,
   b. casting a material around said plurality of tubular members so as to completely enclose one end of the assembled tubes,
   f. finishing the cast structure to the desired specifications while maintaining one end of the tubular members open,
   d. x-raying the finished structure to establish the precise location of the individual tubes,
   e. drilling a hole through the cast structure to intersect with each individual tube at the desired distance along the length thereof and by using the x-ray film as a template.

2. The method of claim 1 wherein said perforated metal structure is an airfoil designed for wind tunnel testing and the cast metal is selected from the group consisting of aluminum and aluminum alloys.

3. The method of claim 2 wherein said tubular members are formed of thin walled steel and wherein the ends of the steel tubes embedded in the cast structure are crimped closed prior to casting of the metal.

4. The method of claim 1 wherein the plurality of tubular members are of diverse lengths and are clamped together in spaced relationship prior to casting the metal structure therearound.

5. A method of constructing an aerodynamic wind tunnel test model having a series of openings therein for making pressure measurements at diverse locations on the model during a wind tunnel test, comprising the steps of:
   a. providing a plurality of tubular bodies of diverse lengths in a fixed array,
   b. closing one end of each of said tubular bodies,
   c. casting a solid material about said tubular bodies so as to form an aerodynamic configuration thereabout that embeds the closed ends of the tubular bodies adjacent the leading edge of the configuration while leaving the open ends thereof exposed at the trailing edge of the configuration,
   d. drilling a hole perpendicular to the individual tubular bodies through the cast solid so as to form an intersecting passageway perpendicular with the passageway in each of the tubular bodies and each perpendicular passageway being a different distance from the leading and trailing edge of the aerodynamic configuration than an adjacent passageway whereby pressure sensing instrumentation may be connected to the open end of each tubular body adjacent the trailing edge of the aerodynamic configuration to thereby make pressure measurements on the wind tunnel model at diverse locations thereof during a wind tunnel test.

6. The method of claim 5 wherein said tubular bodies are clamped between two aluminum blocks to form the fixed array.

7. The method of claim 5 wherein the cast solid material is selected from aluminum and aluminum alloys and said tubular bodies are formed of stainless steel.

8. The method of claim 5 wherein an x-ray print is made of the cast solid material and said x-ray print is employed as a template to precisely locate the individual tubular bodies to permit drilling of the perpendicular hole through the cast solid material at a precise location along the length of the individual tubular bodies.

* * * * *